March 29, 1955     F. J. KIRKMAN     2,705,251
PRIMARY CELL AND BATTERY
Filed Oct. 1, 1953     2 Sheets-Sheet 1
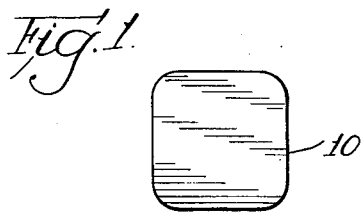
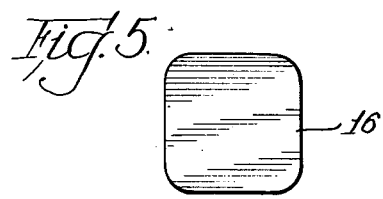
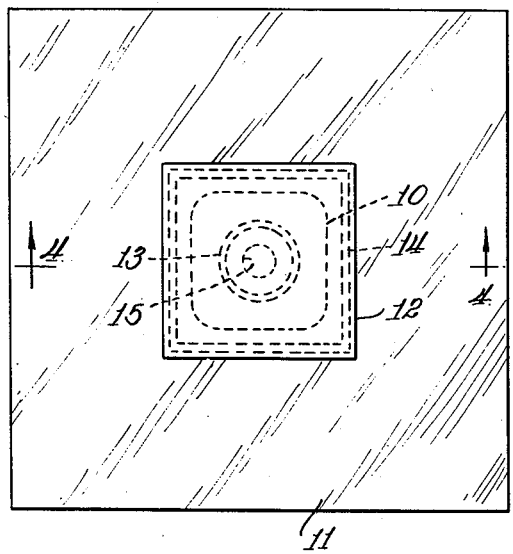
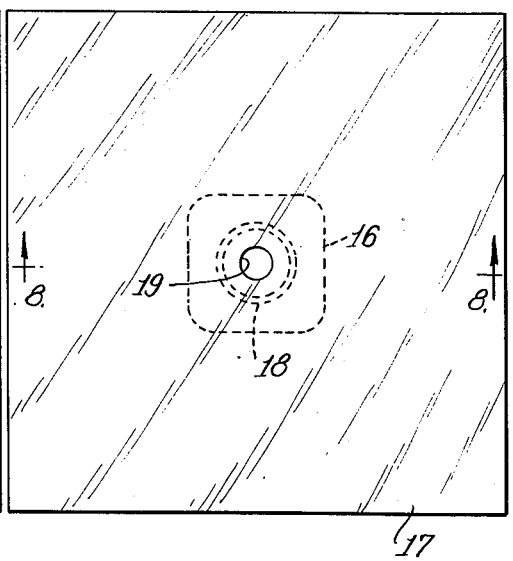
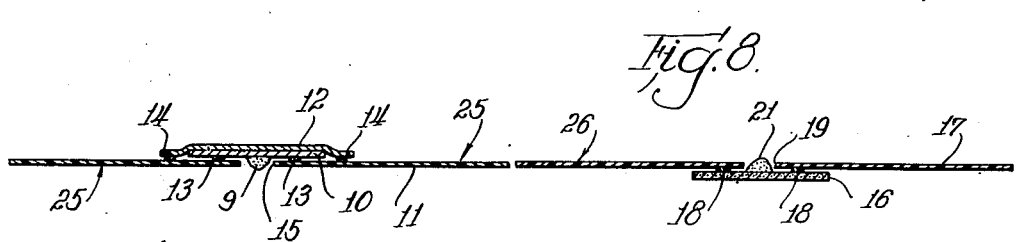
INVENTOR.
Fredrick J. Kirkman
BY
Jones, Tesch & Darbo   att'ys.

March 29, 1955  F. J. KIRKMAN  2,705,251
PRIMARY CELL AND BATTERY
Filed Oct. 1, 1953  2 Sheets-Sheet 2

INVENTOR.
Fredrick J. Kirkman
BY
Jones, Tesel & Darby
Attys.

United States Patent Office 2,705,251
Patented Mar. 29, 1955

2,705,251

PRIMARY CELL AND BATTERY

Fredrick J. Kirkman, Freeport, Ill., assignor to Burgess Battery Company, Freeport, Ill., a corporation of Delaware Application October 1, 1953, Serial No. 383,442

8 Claims. (Cl. 136—111)

This invention relates to improvements in primary cells of the flat type, that is, cells in which the elements are thin and flat and arranged in parallel, juxtaposed, laminar relation. More specifically, the invention relates to an improved construction for small cells which are adapted for use in multiple-cell batteries in which the cells are connected in series and positioned in stacked relation. The batteries are small and designed for use in portable electronic equipment where the diminutive size of the battery is important. The invention also relates to an improved negative electrode sub-assembly for such a cell and a multiple-cell battery of such cells.

In small batteries of the character described there exists a number of problems, for example, a problem of providing means for isolating the electrolyte of one cell from the electrolyte of the other cells, whereby there is no leakage of electrolyte between cells. Such leakage results in short circuits, local action on the negative electrodes, loss of energy and capacity and generally unsatisfactory performance and failure. Another problem is the prevention of particles of depolarizing mix of a cell from coming into contact with the negative electrode, which also results in short circuits and local action at such electrode. Another problem is the provision of adequate space for the active materials. Another problem is the provision of good electrical connection between the cells which is of high conductivity, rugged and permanent and does not break or become loosened with the jarring and other stresses which occur during shipping, handling and use. In addition, there is the important problem of providing a cell and battery which is acceptable from the standpoints mentioned and is still simple to manufacture and economical as to cost of materials and method of fabrication and lends itself to rapid machine production.

The primary object of the invention is to provide an improved cell and battery structure in which the aforesaid problems are satisfactorily met, wherein the electrolyte of each cell is effectively isolated from the electrolyte of the other cells, a maximum amount of space is available for the active materials, and the intercell connections are highly conductive, rugged and durable.

Another object is to provide a cell of the character described in which the anode is separated from the mix cake in such manner that particles of mix cannot make contact with the anode and create local couples.

Another object is to provide a cell of the character described in which the active elements are completely enclosed in a dielectric envelope whereby the cell can be aged and tested before it is incorporated in a battery.

Another object is to provide a multiple-cell battery composed of a compressed stack of flat cells in which the pressure within the stack is distributed over a dielectric retaining means of wide area and high strength.

Another object is the provision of an improved cell and battery construction which is simple and economical from the standpoints of structure, materials, and method of fabrication, and which lends itself to rapid machine production of the cells and batteries.

Another object is to provide an improved negative electrode sub-assembly for a cell of the character described.

Other objects and advantages will become apparent from the following description which is to be taken in conjunction with the accompanying drawings, in which Fig. 1 is a plan view of a negative electrode utilized in an embodiment of the cell of the invention;

Fig. 2 is a transverse sectional view of the negative electrode of Fig. 1;

Fig. 3 is a plan view of a negative electrode member sub-assembly including the electrode of Figs. 1 and 2;

Fig. 4 is a transverse sectional view of the negative electrode sub-assembly taken along line 4—4 of Fig. 3;

Fig. 5 is a plan view of a positive electrode utilized in an embodiment of the cell of the invention;

Fig. 6 is a transverse sectional view of the positive electrode of Fig. 5;

Fig. 7 is a plan view of a positive electrode member sub-assembly including the electrode of Figs. 5 and 6;

Fig. 8 is a transverse sectional view of the positive electrode member sub-assembly taken along the line 8—8 of Fig. 7;

Figure 9:
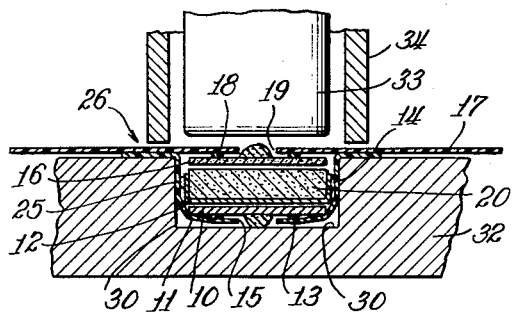
Fig. 9 is a sectional elevation, slightly expanded, of a cell at an intermediate stage in its construction showing the positioning of the cell elements.
Figure 10:
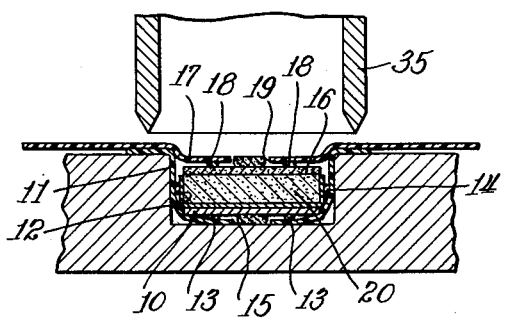
Fig. 10 is a sectional elevation of a cell at a further stage in its construction.
Figure 11:
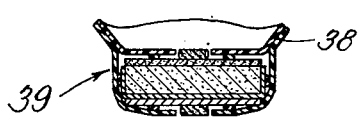
Fig. 11 is a sectional elevation of a completed cell embodiment of the invention.

Referring to Figs. 1 to 4, the negative electrode 10 is a thin, flat plate- or sheet-form element composed of a suitable negative metal, such as zinc. It is square in shape and the lateral shape of the cell is likewise square. The shape factor is not important and any suitable shape may be used, such as rectangular, round, oval, etc. Parallel and adjacent to one broad surface of said negative electrode 10 is the thin, impervious, non-conductive, thermoplastic, electrolyte-resistant film or sheet 11. Suitable materials for such a sheet are the rubber hydrochloride product known as "Pliofilm," the co-polymer of vinyl acetate and vinyl chloride or the like. The sheet 11 is also square in shape and substantially larger in area than the negative electrode. Thermoplastic sheet 11 is flexible and has the known quality of adhering to itself upon the application of heat. The impervious sheet 11 has an aperture 15 therein located centrally of both the sheet and the negative electrode 10 whereby the negative electrode overlies said aperture. Surrounding aperture 15 and between impervious sheet 11 and negative electrode 10 is a ring 13 of electrolyte-resistant, adhesive material such as pitch, tar or the like, which adhesively joins said negative electrode 10 and sheet 11 together.

Parallel and adjacent to the opposite broad surface of the negative electrode 10 is a thin, flexible, non-conductive, bibulous sheet 12 which is composed of suitable material such as blotting paper or the like and constitutes an electrolyte-receptive element of the cell. The advantage of flexibility in this element will be explained hereinafter. The bibulous sheet 12 is also square in shape and is substantially larger in area than the negative electrode 10 but smaller than the impervious sheet 11. The electrode 10 and sheets 11 and 12 are arranged as shown so that a circumferential margin of the bibulous sheet 12 extends beyond the electrode 10 and a circumferential margin of the impervious sheet 11 extends beyond the bibulous sheet. The extending margins of the bibulous sheet 12 and the impervious sheet 11 are brought together beyond the edges of the negative electrode 10 and are joined together by a second continuous ring 14 of electrolyte-resistant, adhesive material, similar in composition to ring 13, the ring 14 forming an encirclement of the electrode beyond the edges thereof. In this manner the negative electrode 10 is completely enclosed except for that portion of its broad surface which is exposed at aperture 15. A small mass of plastic conductive composition 9 is applied to the surface of electrode 10 which is exposed at opening 15. A suitable composition is one made of finely divided silver particles in a wax-like binder-lubricant composed of microcrystalline wax, paraffin wax or the like as is disclosed in the copending application of Sam Kurlandsky, Serial No. 161,892, filed May 13, 1950, now Patent No. 2,666,803. The mass is preferably applied in the heated condition when it is soft and makes intimate adhesive contact with the electrode. The negative electrode 10 and its associated elements constitute a water so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

*Example 1*

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

*Example 2*

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

*Example 3*

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

*Example 4*

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

*Example 5*

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

*Example 6*

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

*Example 7*

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 cm.³ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.

ing does not completely cover the bottom of the tray but leaves the central portion of said bottom exposed.

A stiff dielectric plate 48 having a conductive terminal 49 projecting therethrough is placed within the tray with the terminal in contact with the exposed bottom of the tray. The plate is composed of a suitable dielectric material such as synthetic resin, fiberboard or the like. The battery terminal lead 50 is suitably connected to the plate terminal 49.

Figure 12:
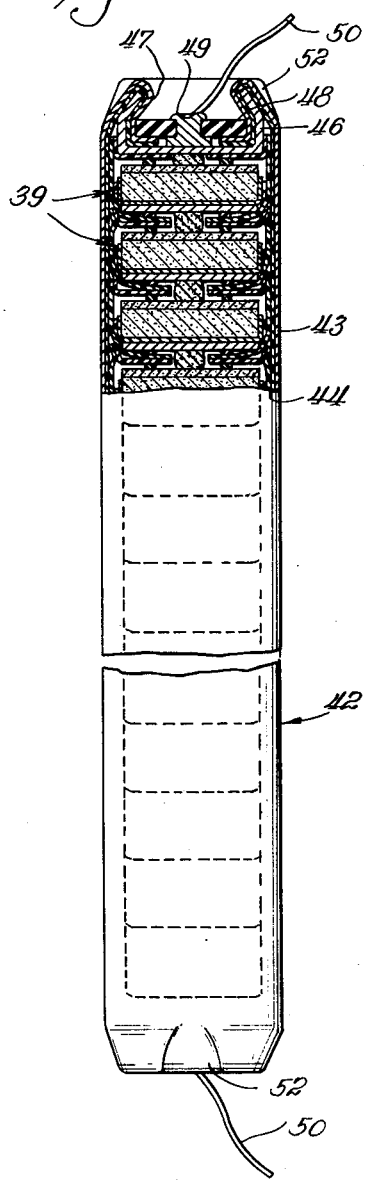
Fig. 12 is an elevational view, partly in section, of a completed multiple-cell battery showing the internal positioning of the cell embodiment shown in Fig. 11.

To form the closure, the upwardly projecting rim of the tray 46 and the portions of the casing 42 which cover said rim are locally crimped inwardly a substantial distance whereby the crimps 52 so formed press downwardly upon the marginal portion of plate 49 and clamp said plate firmly in position. Such clamping action creates a locked closure which maintains the stack of cells firmly compressed. It also creates firm mechanical and electrical pressure contact between the terminal 49 and the bottom of tray 46 and between the bottom of tray 46 and the conductive mass 21 of the uppermost cell. The number and location of the crimps 52 may be as desired, there being one such crimp located substantially centrally of each side wall of the tray in the specific embodiment of Fig. 12. As stated heretofore, the same closure-terminal arrangement is provided at the other end of the battery, and such arrangement will not be described herein. The closure structure which has been described is the subject of the copending application of Ray D. Arbogast, Serial No. 383,587, field October 1, 1953.

In the cell of the present invention, the zinc anode 10 is effectively separated from the depolarizer mix so that it is not possible for the particles of the mix to make contact with the anode and create local couples. The bibulous separator 20 being adhesively joined to the impervious sheet 11 in a continuous line encircling the edge of the anode, the particles of mix are effectively prevented from coming into contact with the anode.

As has been stated heretofore, in the cell of the invention the active elements are completely enclosed in the dielectric envelope 38 whereby the cell can be aged and then tested for defects before it is incorporated in the battery.

The cell also permits substantial leeway in the amount of mix, whereby control need not be exact, and the amount may be varied to adapt the cell for a particular type of service. This flexibility is provided by employing a relatively wet mix which is soft, plastic and easily molded under pressure, and providing space within the cell envelope 38 into which the mix can move laterally under the pressure. In the battery of the present invention, when the stack of cells is compressed longitudinally, the mix cakes spread laterally and substantially fill the cell envelopes, and the overall length of the battery is determined by the aggregate amount of mix present in the cells thereof.

In the multiple-cell battery of the invention, the pressure created in compacting the stack of cells is distributed over a retaining means of relatively wide area and high strength since in each cell, the envelope 38 extends outwardly to the wall of the casing 42 whereby substantially the entire area and strength of the casing serves to fortify and strengthen the envelopes for the individual cells. Cells usually undergo expansion in use with resulting increase in internal pressure, and the retaining means of wide area and high strength is useful in resisting the force created by such pressure. Such strengthened envelopes also resist the leakage of the electrolyte from the individual cells.

The cells and battery of the present invention are also economical of space since the only separations between the cells are the very thin sheets or films 11 and 17. As a result, a maximum amount of space within the casing is occupied by the active elements.

The cells are simple and economical from the standpoint of both structure and manufacture. All of the elements including the mix cake are initially in the form of sheets or strips which are blanked out to form the elements. Such a structure lends itself to rapid machine production, and the result is a cell of structural simplicity. Also, close control is easily obtained, and as one attribute of this, the openings 15 and 19 of the impervious sheets 11 and 17 are located centrally of the adjacent electrodes, whereby in the multiple cell battery the openings of contiguous sheets are in substantially exact registry with one another which insures satisfactory intercell connection by the masses 9 and 21.

While only a single embodiment of the invention has been described, the invention is not limited thereto and changes and modifications may be made within the spirit of the invention by those skilled in the art.

Invention is claimed as follows:

1. A flat cell made up of a plurality of flat cell elements in juxtaposed laminar arrangement, comprising a pair of preassembled positive and negative electrode units, each said electrode unit comprising a flexible, impervious, non-conductive sheet having an opening therein, an electrode adjacent to said sheet and overlying said opening, said sheet being of greater area than said electrode whereby a peripheral margin of said sheet extends beyond said electrode, and a ring of electrolyte-resistant adhesive between said electrode and said sheet and surrounding said opening and attaching said sheet to said electrode, a bibulous, nonconductive sheet adjacent to the broad surface of the negative electrode remote from the impervious sheet of said negative electrode unit, said bibulous sheet being of greater area than said negative electrode and of lesser area than said last mentioned impervious sheet whereby a peripheral margin of said bibulous sheet extends beyond the edges of said negative electrode and a peripheral margin of said last mentioned impervious sheet extends beyond the edges of said bibulous sheet, a ring of electrolyte-resistant adhesive between and adhesively attaching together the peripheral margins of said bibulous and impervious sheets of said negative electrode unit to enclose said negative electrode between said last mentioned sheets, said electrode units each being positioned with the impervious sheet thereof toward the outside of the cell, and a depolarizer mix cake positioned between and in contact with the positive electrode and the bibulous element, the peripheral margins of the bibulous and impervious sheets of the negative electrode unit being folded along the lateral surfaces of the mix cake in such manner that the margin of the bibulous sheet forms the rim of a cup supporting said mix cake and the margin of the impervious sheet engages the margin of the impervious sheet of the positive electrode member, the peripheral margins of said impervious sheets being joined together in sealing relation to form an envelope for said cell.

2. A flat cell made up of a plurality of flat cell elements in juxtaposed laminar arrangement, comprising a pair of preassembled positive and negative electrode units, each said electrode unit comprising a flexible, impervious, non-conductive sheet having an opening therein, an electrode adjacent to said sheet and overlying said opening, said sheet being of greater area than said electrode whereby a peripheral margin of said sheet extends beyond said electrode, and a ring of electrolyte-resistant adhesive between said electrode and said sheet and surrounding said opening and attaching said sheet to said electrode, a bibulous open-top cup between said electrode units with the bottom thereof adjacent to the negative electrode, and a depolarizer element within said cup with one surface thereof in contact with the positive electrode, said electrode units each being positioned with the impervious sheet thereof toward the outside of the cell, the peripheral margin of the impervious sheet of the negative electrode unit being folded along the lateral surfaces of the cell in adhesive juncture with the rim of said bibulous cup and also with the peripheral margin of the impervious sheet of the positive electrode unit to form a sealed envelope for the cell.

3. A flat cell made up of a plurality of flat cell elements in juxatposed laminar arrangement, comprising a pair of positive and negative electrode units, each said electrode unit comprising a flexible, impervious, non-conductive sheet having an opening therein, an electrode adjacent to said sheet and overlying said opening, said sheet being of greater area than said electrode whereby a peripheral margin of said sheet extends beyond said electrode, and a ring of electrolyte-resistant adhesive between said electrode and said sheet and surrounding said opening and attaching said sheet to said electrode, said electrode units each being positioned with the impervious sheet thereof toward the outside of the cell, a bibulous non-conductive cup-shape element between said electrode units with the bottom thereof adjacent to the negative electrode, and a depolarizer element within said bibulous